(12) United States Patent
Carroll et al.

(10) Patent No.: US 7,711,548 B2
(45) Date of Patent: May 4, 2010

(54) METHOD AND STRUCTURES TO ENABLE NATIONAL LANGUAGE SUPPORT FOR DYNAMIC DATA

(75) Inventors: Timothy J. Carroll, Tampa, FL (US); Andrew J. Greff, Souffville (CA); David G. King, Oakville (CA)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 10/746,708

(22) Filed: Dec. 23, 2003

(65) Prior Publication Data

US 2005/0137845 A1 Jun. 23, 2005

(51) Int. Cl.
*G06F 17/20* (2006.01)

(52) U.S. Cl. .............. 704/8; 704/2; 704/5; 704/277

(58) Field of Classification Search ............ 704/1–10, 704/277, 270; 709/218, 201; 707/1, 100, 707/3; 715/703

See application file for complete search history.

(56) References Cited

U.S. PATENT DOCUMENTS

| | | | | |
|---|---|---|---|---|
| 5,787,410 A | * | 7/1998 | McMahon | 707/1 |
| 5,917,484 A | * | 6/1999 | Mullaney | 715/703 |
| 6,339,755 B1 | * | 1/2002 | Hetherington et al. | 704/8 |
| 6,370,498 B1 | * | 4/2002 | Flores et al. | 704/3 |
| 6,981,031 B2 | * | 12/2005 | French et al. | 709/218 |

* cited by examiner

Primary Examiner—Huyen X. Vo
(74) Attorney, Agent, or Firm—Arthur J. Samodovitz

(57) ABSTRACT

Disclosed are a method and system for enabling multi-language support for data. A piece of data is captured and translated into a plurality of languages. The original data and all of the translations are stored in the same database instance, for retrieval and presentation in any of a group of languages. The preferred embodiment of the invention provides a design and implementation of generalized database tables to implement the features of NLS Locales and NLS Text Groups, in order to enable the storage and retrieval of dynamic, textual data in multiple languages, concurrently, in a single database instance. The invention enables the scenario wherein a piece of data captured in one language is dynamically translated into all supported languages, and all translations are stored in the same database instance, for retrieval and presentation in any of the supported languages.

11 Claims, 5 Drawing Sheets

FIG. 1
Example set of ISO Language codes and Country codes

Language table

| code | language |
|------|----------|
| 'en' | English |
| 'es' | Spanish |
| 'fr' | French |
| 'ja' | Japanese |
| ... | ... |

Country table

| code | country |
|------|---------|
| 'CA' | Canada |
| 'ES' | Spain |
| 'FR' | France |
| 'JP' | Japan |
| 'US' | United Statues |
| ... | ... |

FIG. 2
Example set of NLS Locales

| code | Meaning |
|------|---------|
| 'en_CA' | - cultural preferences regarding us of the English language in Canada |
| 'en-US' | - cultural preferences regarding use of the English language in the United States |
| 'fr_CA' | - cultural preferences regarding use of the French language in Canada |
| | |

FIG. 3
Schematic of the NLS Locale model

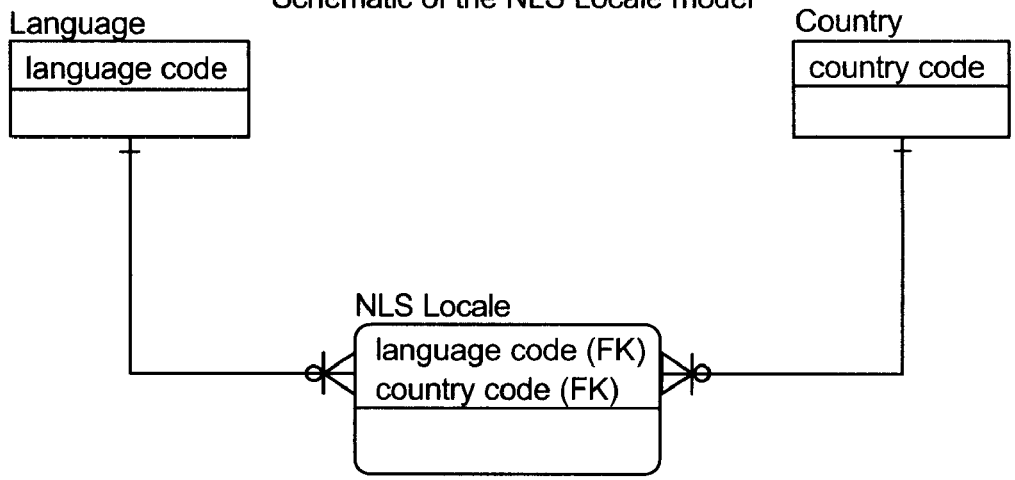

FIG. 5

Example of 'Customer' table that is not NLS-enabled.
Note 'description' data carried is as attribute of Customer entity.

Customer table

| cust id | account code | description | etc. |
|---|---|---|---|
| 127 | AF24916 | Milky Way Co., Ltd is a Hong Kong based airline company providing flights to most major cities. | ... |
| ... | | ... | ... |

FIG. 6

Example of 'Customer' table that is NLS-enabled.
Note association with NLS Text Group and NLS Text table storing 'description' data in multiple languages.

Customer table

| cust id | account code | nls text group id | etc. |
|---|---|---|---|
| 127 | AF24916 | 3156729195 | ... |
| ... | ... | ... | ... |

NLS Text Group table

| nls text group id |
|---|
| 3156729195 |
| ... |

NLS Text table

| nls text group id | language code | country code | text field 1 |
|---|---|---|---|
| 3156729195 | en | US | Milky Way Co., Ltd. is a Hong Kong based airline company providing flights to most major cities. |
| 3156729195 | fr | FR | Milky Way Co., Ltd est une compagnie aerienne dont le slege social est a Hong Kong et qui dessert la plupart des villes principales. |
| 3156729195 | es | ES | Milky Way Co., Ltd. es una compania aerea con sede en Hong Kong que ofrece vuelos a las principales ciudades. |
| ... | ... | ... | ... |

Schematic showing association of Data Entities with generalized NLS Text Group and NLS Text stored by Locale.

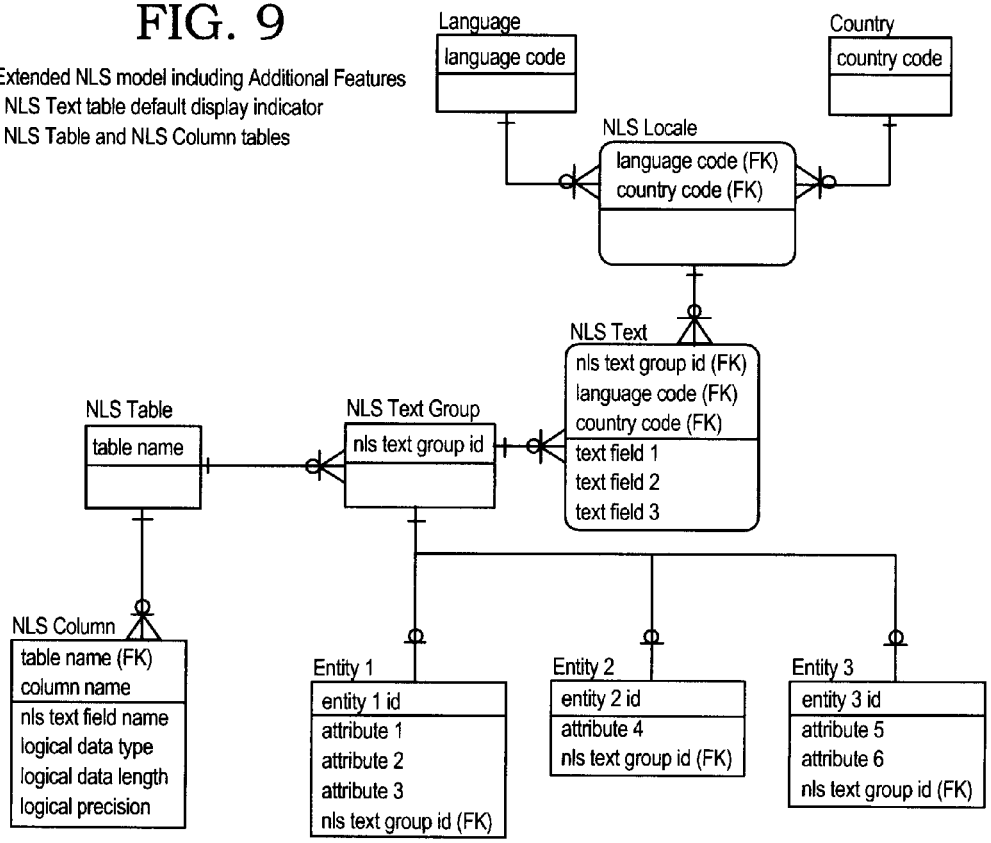

FIG. 8
Example of NLS Table and NLS Column tables and association with NLS Text Group

NLS Table table

| table name |
|---|
| Customer |
| ... |

NLS Text Group table

| nls text group id | table name |
|---|---|
| 3156729195 | Customer |
| ... | ... |

NLS Column table

| table name | column name | nls text field name | data type | data length | precision |
|---|---|---|---|---|---|
| Customer | description | text field 1 | char | 128 | |
| ... | ... | ... | ... | ... | |

FIG. 9
Extended NLS model including Additional Features
- NLS Text table default display indicator
- NLS Table and NLS Column tables

METHOD AND STRUCTURES TO ENABLE NATIONAL LANGUAGE SUPPORT FOR DYNAMIC DATA

BACKGROUND OF THE INVENTION

1. Field of the Invention

This invention generally relates to a method and to database structures that enable multi-language support for dynamic data, as part of an overall National Language Support (NLS) strategy. More specifically, the invention relates to a method that enables the persistent storage of textual data in multiple languages, concurrently, in a single database instance, and the retrieval for presentation of that data in a language appropriate for the specified NLS locale.

2. Background Art

When discussing systems applications, National Language Support refers to the ability to present information to users of an application with consideration for the particular linguistic and cultural preferences of a designated locale. In addition to the need to support multiple languages and dialects, these considerations include region-specific calendars, currency, date and time formatting, dictionary sorting, message formatting, number formatting, and text that flows in directions other than left-to-right.

Many NLS enablement functions (particularly those involving formatting) are the assigned responsibility of the presentation component of an application. This discussion, however, is focused on considerations for managing translatable, textual data and the persistent storage and retrieval of that data in multiple languages. Note that this refers specifically to storing the same piece of data in multiple languages and not simply to storing multiple pieces of data each in a different language.

Development of an NLS enabled application begins with a structuring of application components that effectively separates data from application logic, a technique known as "internationalization." There is then a choice of design strategies, either "localization" or "globalization." A localization approach involves adapting the application for a specific region and language, a process that must be repeated for each supported locale. Globalization refers to implementation of the application so that a single instance, simultaneously, accommodates any region and language.

The increasing use of web-based applications has enabled businesses to extend their area of operations beyond regional and national boundaries, and there is a corresponding need to develop and implement NLS enabled systems applications. In general, adoption of a globalization strategy delivers NLS enabled applications which are far less expensive to build and maintain. The key to globalization is the deployment of a single instance of each application for use around the world rather than duplicate parallel application instances each supporting a different locale.

The information presented to users of an application can be viewed as a combination of data that falls into three categories. There is, typically, "dynamic data" that has been captured and maintained through use of the application (either interactively by users or received from other system components), "static reference data" that is provided with the application and defines the valid context for the application's use (for example, the recognized set of status codes), and "other static information," including titles, headings, and labels, that form the template on which data are presented to the user.

There is a considerable volume of literature available on NLS enablement techniques for static data, including both static reference data and user interface templates. In cases where products have implemented NLS enabled solutions, however, the multi-language capability is either limited to static data, or the implementation is based on a strategy of localization and requires the deployment of multiple database instances, each supporting a single locale.

Known solutions for NLS enablement do not implement a globalization strategy when addressing the need for the persistent storage of dynamic, textual data in multiple languages. Instead, the use of a localization strategy assumes either that access to the data in each application instance will be limited to the single, supported locale, or that the application will be supplemented with routines to replicate data in order to provide integration across application instances. The dependence on localization results in the increased cost of application deployment, operation, and maintenance, and the inherent risk of inconsistencies in data and processing logic.

SUMMARY OF THE INVENTION

An object of this invention is to enable the storage and retrieval of dynamic textual data in multiple languages, concurrently, in a single database instance.

Another object of the invention is to implement a globalization strategy when addressing the need for the persistent storage of dynamic, textual data in multiple languages.

These and other objectives are attained with a method and system for enabling multi-language support for data. The method comprises the steps of capturing a piece of data in a first language, and translating the piece of data into a plurality of additional languages. The original piece of data and all of the translations are stored in the same database instance, for retrieval and presentation in any of a group of supported languages. The preferred embodiment of the invention provides a design and implementation of generalized database tables to implement the features of NLS Locales and NLS Text Groups, in order to enable the storage and retrieval of dynamic, textual data in multiple languages, concurrently, in a single database instance. The invention can also be embodied in a program storage device readable by machine tangibly embodying a program of instructions executable by machine to perform method steps for enabling multi-language support for data.

Among other advantages, the present invention enables the scenario wherein a piece of data captured in one language is dynamically translated into all supported languages, and all translations are stored in the same database instance, for retrieval and presentation in any of the supported languages.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 1 shows examples of ISO language codes and country codes that may be used in the practice of this invention.

FIG. 2 is a table having an example set of NLS Locales.

FIG. 3 is a schematic diagram of the NLS Locale model

FIG. 5 is an example of a "Customer" table that is not NLS-enabled.

FIG. 6 is an example of a "Customer" table that is NLS-enabled.

FIG. 8 shows examples of NLS Table and NLS Column tables and association with NLS Text Group.

FIG. 9 illustrates an extended NLS model.

DETAILED DESCRIPTION OF THE PREFERRED EMBODIMENTS

National Language Support (NLS) is based on the definition of recognized Locales, each representing an established set of linguistic and cultural preferences. These preferences are most commonly grouped by language and country or region, and each Locale is identified by the combination of a language code and a country code. In the preferred embodiment of this invention, the language and country codes used are those defined and maintained by the International Standards Organization (ISO). Specifically, ISO standards ISO 3166 and 639 provide country and language codes, respectively.

As illustrated in FIG. 1, languages are represented by two-character, lower case codes. Countries are represented by two-character, upper-case codes.

The combination of codes representing each Locale is typically displayed with the language code followed by the country code, separated by an underscore. For example, "en_US" indicates the variant of the English language as used in the United States and the cultural conventions of the U.S.A. FIG. 2 shows examples of NLS Locale codes and their meanings.

With reference to FIG. 3, in the preferred embodiment of this invention, the features of the Locale Model are implemented as individual tables and relationships in the application database.

It may be noted that in enabling an application for NLS support, the application must have the ability to identify the preferred Locale of individual users. This is typically achieved through implementation of a User Profile which includes the preferences specified by each user. It may, alternatively, be done on a per session or even a per transaction basis. In the practice of this invention, any suitable structure may be used to support the concept of User Profile.

Data Capture and Translation

In one implementation of this invention, the data being captured or maintained (either interactively through a user interface or another component of the system) is submitted to the database component along with the NLS locale specified by the user. Some of the data elements may be defined as requiring translation before being presented to users who have specified the preference for a different NLS locale.

Figure 4:
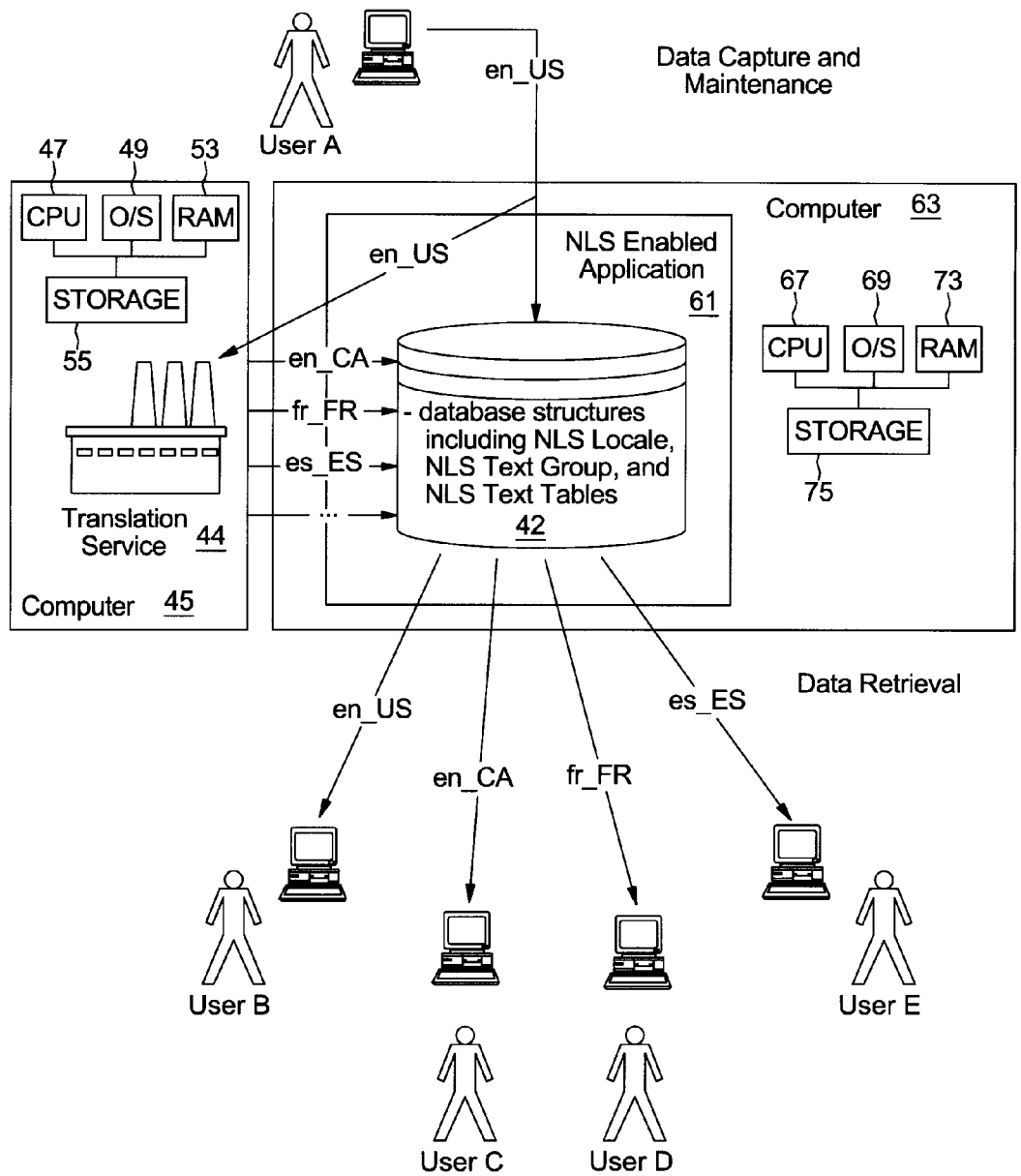
FIG. 4 illustrates NLS enablement for dynamic data.
Figure 7:
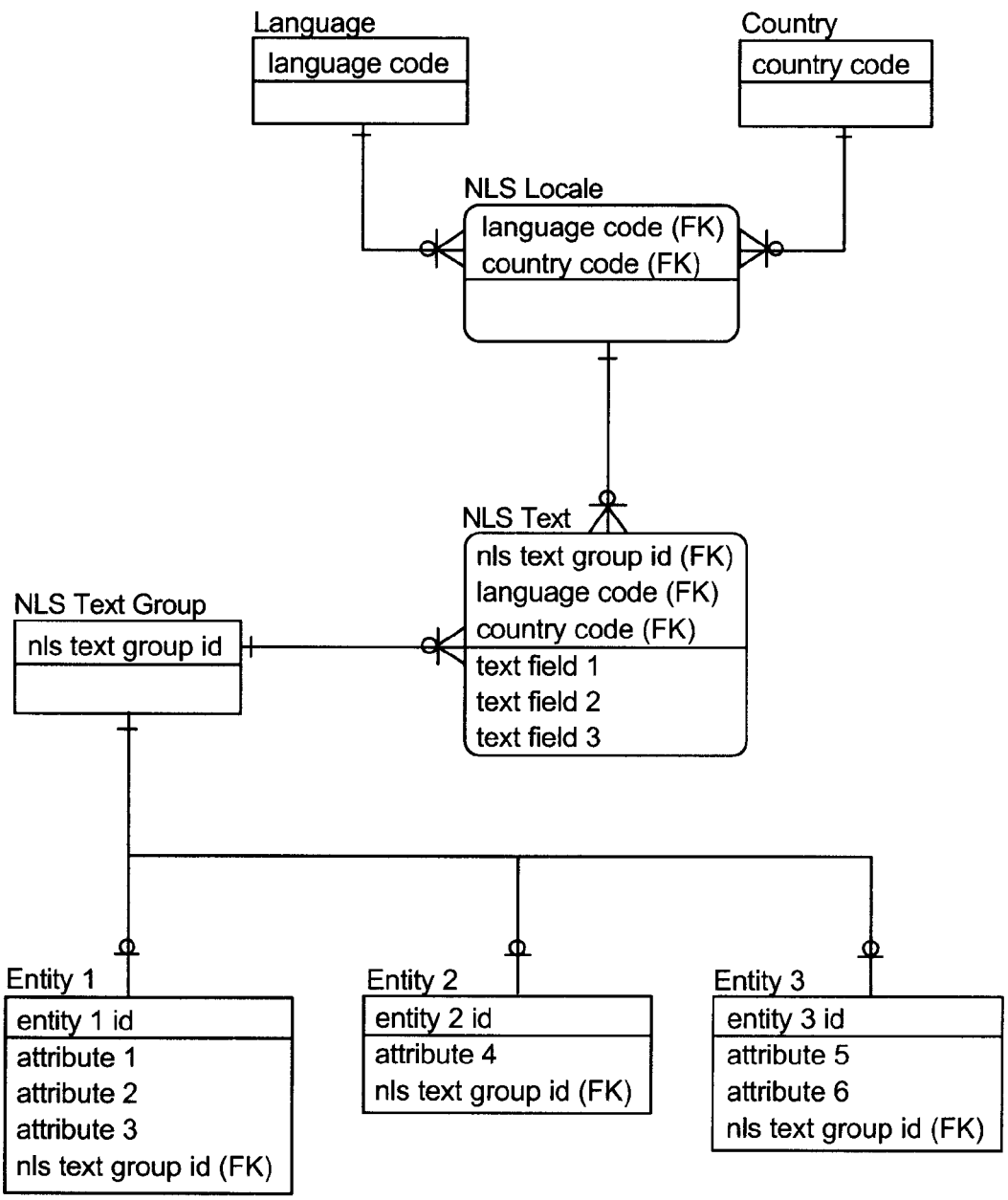
FIG. 7 shows the association of data entities with generalized NLS Text Group and NLS Text stored by Locale.

As illustrated in FIG. 4, the process for storing "data requiring translation" in the database 42 also invokes a service 44 that is responsible for generating translations of the data for each supported locale. As each set of translated text is returned from the translation service 44, it too is stored in the database 42 and associated with the specific NLS locale for which the translation was performed.

As will be apparent to those of ordinary skill in the art, any suitable process may be used to interact with a translation service; and for example, this process may have specific dependencies on the technology used by the application system and the selected translation service. Also, this translation service may involve use of automated translation machines, or manually supported translation services, for example, the use of an IBM Translation Service Centre (TSC).

NLS Text Group and Text Tables

Data elements not requiring translation can be stored as attributes of a specific entity, implemented as a table in the database. Data elements designated as requiring translation are stored in tables designed to contain multiple translations of the data value.

Each translation of the data value is associated, not only with the entity to which the attribute belongs, but also with the NLS locale for which the translation was performed. The design and use of the desired database structures is greatly simplified by employing a generalized set of tables to hold the translated text values for all attributes of all entities.

The NLS Text Group is defined as the set of attributes of a specified entity that require translation in order to enable NLS. In the preferred embodiment of this invention, the NLS Text Group is implemented as a table in the database and associated with each entity that has attributes requiring translation. A row is generated and stored in the NLS Text Group table for each row in each table that implements an entity with translated data element values. The association with the specific entity is implemented as a foreign key relationship to the table that implements the entity. FIG. 5 illustrates a Customer table that is not associated with an NLS Text Group, and FIG. 6 shows a Customer table that is associated with an NLS Text Group.

With particular reference to FIG. 6, in the NLS Text table, the number of text field columns is sufficient to store the largest set of translatable attributes of any implemented entity, and the character string length of the fields is sufficient to accommodate the maximum length of the translated data values. The number and size of the text fields may need to be adjusted as additional entities are implemented in the database, or as NLS is extended to additional locales.

Also, the preferred embodiment of the invention implements the NLS Text Group at a row level, where each entry in the NLS Text Group table is associated with a row in a specific entity table. Alternatively, the NLS Text Group can be implemented at a column level, where each entry in the NLS Text Group table corresponds to a single column in an entity table. While this will avoid problems associated with the multiplicity of text fields in the NLS Text table, it adds considerable complexity to the design and use of the database, and may impact runtime performance.

It may be noted that, although the present discussion is focused on dynamic data, captured and maintained interactively, the above-described structures can also be used for static reference data that is pre-loaded in the database during application deployment.

Data Retrieval

The preferred embodiment of the invention also enables retrieval of data, for either presentation to the user or transmission to another component of the system, and this retrieval of data may be constrained to a specified NLS locale. As during data capture, the application must have the ability to identify the preferred locale of individual users.

Data elements not requiring translation can be selected from the database tables used to implement the entities. Access to data elements which have been translated for each locale must access the entity tables and the associated rows in the NLS Text table, making use of the "nls text group id" column on the entity table and the "language code" and "country code" values which identify the specified NLS locale.

It is possible that, at the time of data retrieval, the translation of a requested data value may not be available for a specified locale. This may occur due to a time lag between the initial capture of the data and the response from the translation service. Additional application features, discussed below, may be implemented to provide an appropriate response to the user.

Additional Features

1. Locale Substitution

During data retrieval, if a translation for the specified locale is not available in the database, it may be appropriate to substitute an existing translation that has been created for another locale. Implementation of a locale substitution strategy should be based on the standards and guidelines governing design of the application.

The substitute translation may be selected from a locale that uses the same language, for example, the substitution of a US English ("en_US") translation when the Canadian English ("en_CA") translation is not available. The application may also, as indicated in FIG. 9, make use of an explicit "default display indicator" stored in the NLS Text table.

2. NLS Text Group Documentation

Explicit documentation of the mapping between entity attributes and the generalized "text fields" (in the NLS Text table) used to store the corresponding data value translation can be used to facilitate application testing and maintenance.

Implementation of generalized data structures, such as the NLS Text Group and Text tables, simplifies application design and execution but complicates the application testing and maintenance process. As shown in FIG. 9, additional tables are included in the, Extended NLS Enablement data model to contain the required mapping.

With reference to FIGS. 8 and 9, the NLS Table table is used to identify explicitly the entity table with which the set of translated data elements is associated. The NLS Column table explicitly identifies the logical attribute that corresponds to the individual text fields in the NLS Text table. This Column table is also used to record the logical attribute name, data type, length, and precision.

These tables are populated and maintained during application development and maintenance activities and are not, typically, accessed during application execution. They are used during application testing to confirm the contents of the NLS Text Group and NLS Text tables.

The preferred embodiment of the present invention, as described above, provides a number of important advantages. For example, this embodiment of the invention enables concurrent, multiple language support for dynamic data, rather than simply static data; and leverages implementation of a globalization strategy employing a single database instance, rather than multiple instances each supporting a single locale. Also, the preferred embodiment of this invention achieves benefits associated with globalization including consistency, flexibility, and lower total cost of ownership. In addition, the present invention is extensible to support additional NLS locales without design modification, can be extended to incorporate additional data elements requiring translation, and can use row-level data access to optimize application performance.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer-implemented method for enabling persistent storage of textual data in multiple languages, concurrently, in a single database instance, and retrieval for presentation of that data in a language appropriate for a specified locale, the method comprising the steps of:

a computer capturing a piece of data in a first language in a database structure in a computer readable storage media;

a computer translating the piece of data into a plurality of additional languages, each of said first language and said additional languages being associated with a specified locale, said locale being identified by a combination of a specified language and a specified geographic region;

a computer storing the piece of data in the first language and all of said additional languages in one text table instance in the database structure in the computer readable storage media, for retrieval and presentation in any of a group of supported languages, said one text table instance including a plurality of rows, said storing including the step of storing in each row of the text table a unique combination of language and country codes, and storing in each row of the text table a copy of the data item, in a respective one of the first and additional languages, as determined by said unique combination of languages and country codes in said each row; and a computer providing said piece of data to a user computer in one of said pre-translated, stored languages by (i) identifying a locale of the user computer based on a combination of a given language and a given geographic region for the user computer, (ii) using the locale of the user computer, as identified by the combination of the given language and the given geographic region, to identify one of the languages stored in the one text table instance and retrieving from the one text table instance the pre-stored piece of data in the identified one of the languages, and (iii) displaying on the user computer the retrieved piece of data in the identified one of the languages; and performing the capturing, translating and storing steps, a plurality of times to obtain a plurality of groups of translations for a group of data items, including storing each group of translations in a respective one text table, providing each of the text tables with a respective one text Group ID, and storing all of the text Group IDs in a text Group Table.

2. A method according to claim 1, for use with an application program multi-language support, and wherein the piece of data is captured and maintained through use of said application program.

3. A method according to claim 1, wherein:

the translating step includes the step of sending the piece of data in the first language to a translation service; and the storing step includes the steps of i) the translation service sending to a given database component, each of the translations, and ii) for each of the translations, providing said given database component with a country code identifying a country associated with the translation, and a language code identifying the language of the translation.

4. A method according to claim 1, wherein:

the locale of the user is a first specified locale;

a translation for the specified locale is not available in the database; and the providing step includes the step of substituting, for the translation for the specified locale, an existing translation in the database that has been created for another locale.

5. A system for enabling persistent storage of textual data in multiple languages, concurrently, in a single database instance' and retrieval for presentation of that data in a language appropriate for a specified locale, the system comprising:
- a database structure;
- means for capturing a piece of data in a first language in the database structure;
- a translation service for translating the piece of data into a plurality of additional languages, each of said first language and said additional languages being associated with a specified locale, said locale being identified by a combination of a specified language and a specified geographic region;
- the database structure storing the piece of data in the first language and all of said additional languages in one text table instance, for retrieval and presentation in any of a group of supported languages; and
- means for providing said piece of data to a user computer in one of said pre-translated, stored languages by (i) identifying a locale of the user computer based on a combination of a given language and a given geographic region for the user computer, (ii) using the locale of the user computer, as identified by the combination of the given language and the given geographic region, to identify one of the languages stored in the one text table instance and retrieving from the one text table instance the pre-stored piece of data in the identified one of the languages, and
- (iii) displaying on the user computer the retrieved piece of data in the identified one of the languages; and
- wherein the capturing, translating and storing are performed, a plurality of times to obtain a plurality of groups of translations for a group of data items, including storing each group of translations in a respective one text table, providing each of the text tables with a respective text Group ID, and storing all of the text Group IDs in a Text Group Table.

6. A system according to claim 5, wherein:
the translation service sends to a given database component, each of the translations, and the system further comprises means for providing said given database component, for each of the translations, a country code identifying a country associated with the translation, and a language code identifying the language of the translation.

7. A system according to claim 5, wherein:
the piece of data describes an attribute of an entity;
the entity is associated with a defined table; and
the database includes means for storing with each of the translations, a code identifying the defined table.

8. A system according to claim 5, for use with an application using multi-language support, and wherein the piece of data is captured and maintained through use of said application.

9. A readable program storage device readable by machine, tangibly embodying a program of instructions executable by the computer to perform method steps for enabling persistent storage of textual data in multiple languages, concurrently, in a single database instance, and retrieval for presentation of that data in a language appropriate for a specified locale, said method steps comprising:
- capturing a piece of data in a first language in a database structure;
- translating the piece of data into a plurality of additional languages, each of said first language and said additional languages being associated with a specified locale, said locale being identified by a combination of a specified language and a specified geographic region;
- storing the piece of data in the first language and all of said additional languages in one text table instance in the database structure, for retrieval and presentation in any of a group of supported languages, sad one text table instance including a plurality of rows, said storing including the step of storing in each row of the text table a unique combination of language and country codes, and storing in each row of the text table a copy of the data item, in a respective one of the first and additional languages, as determined by said unique combination of languages and country codes in said each row; and
- providing said piece of data to a user computer in one of said pre-translated, stored languages by (i) identifying a locale of the user computer based on a combination of a given language and a given geographic region for the user computer, (ii) using the locale of the user computer, as identified by the combination of the given language and the given geographic region, to identify one of the languages stored in the one text table instance and retrieving from the one table instance the pre-stored piece of data in the identified one of the languages, and (iii) displaying on the user computer the retrieved piece of data in the identified one of the languages and
- performing the capturing, translating and storing steps, a plurality of times to obtain a plurality of groups of translations for a group of data items, including storing each group of translations in a respective one text table, providing each of the text tables with a respective one text Group ID, and storing all of the text Group IDs in a text Group Table.

10. A machine readable program storage device according to claim 9, wherein:
the piece of data describes an attribute of an entity;
the entity is associated with a defined table; and
the storing step includes the step of storing with each of the translations, a code identifying the defined table.

11. A machine readable program storage device according to claim 10, wherein the step of storing the piece of data and all of said translations includes the steps of:
- storing each of the translations in a respective one row of a text table; and
- storing in each row of the text table having one of the translations, a designation identifying the defined table.

* * * * *